(12) United States Patent
Okabe et al.

(10) Patent No.: US 9,624,897 B2
(45) Date of Patent: Apr. 18, 2017

(54) CONTROL DEVICE FOR INTERNAL COMBUSTION ENGINE AND METHOD OF CONTROLLING INTERNAL COMBUSTION ENGINE

(75) Inventors: Takeru Okabe, Chiyoda-ku (JP);
Osamu Ishikawa, Chiyoda-ku (JP);
Tomohisa Shoda, Chiyoda-ku (JP);
Hideaki Tani, Chiyoda-ku (JP); Toru Tanaka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 960 days.

(21) Appl. No.: 13/276,405

(22) Filed: Oct. 19, 2011

(65) Prior Publication Data
US 2012/0271537 A1 Oct. 25, 2012

(30) Foreign Application Priority Data
Apr. 21, 2011 (JP) ................. 2011-094742

(51) Int. Cl.
*F02N 99/00* (2010.01)
*F02D 11/10* (2006.01)
(Continued)

(52) U.S. Cl.
CPC ............ *F02N 99/006* (2013.01); *F02D 11/10* (2013.01); *F02D 41/0002* (2013.01);
(Continued)

(58) Field of Classification Search
CPC ................ F02D 11/10; F02D 13/0226; F02D 2200/0406; F02D 41/0002; F02D 41/065; F02N 11/0814; F02N 11/0844; F02N 99/006; Y02T 10/42; Y02T 10/48

USPC ........ 701/112, 113; 123/179.1, 179.3, 179.4, 123/179.16, 179.18, 339.1, 339.14, 123/339.23, 345–348, 90.15, 399, 391,
(Continued)

(56) References Cited

U.S. PATENT DOCUMENTS 6,305,343 B1 * 10/2001 Sato et al. ............. 123/198 DB
6,441,506 B2 * 8/2002 Nakashima ................. 290/40 C
(Continued)

FOREIGN PATENT DOCUMENTS

EP 1041275 A1 * 10/2000 ............. F02N 11/08
JP 2010-242621 A 10/2010

*Primary Examiner* — Carlos A Rivera
*Assistant Examiner* — Carl Staubach
(74) *Attorney, Agent, or Firm* — Sughrue Mion, PLLC; Richard C. Turner (57) ABSTRACT

A control device for an internal combustion engine capable of controlling an intake-pipe pressure within a range which allows restartability to be ensured. A control device for an internal combustion engine includes: an idle-stop control section for restarting the engine in response to generation of a restart request; and an intake-air amount control section for setting a control amount of an intake system so that the intake air amount becomes zero when an intake-pipe pressure of the engine upon generation of the automatic stop request is higher than a predetermined pressure and setting the control amount of the intake system so that the intake air amount becomes larger than the amount upon generation of the automatic stop request, and then becomes zero when the intake-pipe pressure is lower than the predetermined pressure.

6 Claims, 7 Drawing Sheets

(51) Int. Cl.
*F02D 41/00* (2006.01)
*F02D 41/06* (2006.01)
*F02N 11/08* (2006.01)
*F02D 13/02* (2006.01)

(52) U.S. Cl.
CPC ........ *F02D 41/065* (2013.01); *F02N 11/0814* (2013.01); *F02N 11/0844* (2013.01); *F02D 13/0226* (2013.01); *F02D 2200/0406* (2013.01); *Y02T 10/42* (2013.01); *Y02T 10/48* (2013.01)

(58) Field of Classification Search
USPC ....... 123/491, 492, 198 DB, 179.25, 179.28, 123/568.19, 568.21, 568.22
See application file for complete search history.

(56) References Cited

U.S. PATENT DOCUMENTS

| | | | |
|---|---|---|---|
| 7,079,941 B2 * | 7/2006 | Tetsuno et al. | 701/112 |
| 7,720,591 B2 * | 5/2010 | Takamiya et al. | 701/103 |
| 2011/0184626 A1 * | 7/2011 | Mauritz et al. | 701/102 |

* cited by examiner

CONTROL DEVICE FOR INTERNAL COMBUSTION ENGINE AND METHOD OF CONTROLLING INTERNAL COMBUSTION ENGINE

BACKGROUND OF THE INVENTION

1. Field of the Invention

The present invention relates to a control device for an internal combustion engine (engine) and a method of controlling the internal combustion engine in a vehicle on which an engine automatic stop/start control system (idle-stop control system) for controlling stop and restart of the internal combustion engine is mounted.

2. Description of the Related Art

In recent years, the number of vehicles, on which an engine automatic stop/start control system, so-called idle-stop control system is mounted, is increasing for the purposes of improvement of fuel efficiency and a reduction in gas emission. A general idle-stop control system stops fuel injection (performs fuel-cut) to automatically stop an internal combustion engine (engine) when a driver stops a vehicle. Thereafter, when the driver performs an operation to start the vehicle, for example, a brake-pedal release operation or an accelerator-pedal depressing operation, the idle-stop control system automatically energizes a starter or a motor also serving as a starter to crank the engine to restart the vehicle.

In the idle-stop control system described above, a restart request is sometimes generated immediately after the generation of an automatic stop request while an engine rotation speed is being reduced by the fuel-cut. In this case, if the starter is energized to crank the engine to restart the engine after the rotation of the engine is completely stopped, time from the generation of the automatic stop request to the completion of the restart becomes long. As a result, a delay (slowness) in restart becomes undesirably noticeable to the driver.

Therefore, the following engine restart has been proposed. When the engine rotation speed is within the range in which the restart of the engine is enabled only by the fuel injection in the case where the restart request is generated while the engine rotation speed is being reduced by the fuel-cut in the idle-stop control, the engine is restarted (self-recovered) only by the fuel injection without using the starter.

On the other hand, when the engine rotation speed at the time of generation of the restart request is below the range of rotation speed in which the engine can be self-recovered, the engine is required to be restarted by energizing the starter even before the rotation of the engine is stopped. If an air amount in cylinders is small at this time, a fluctuation in engine rotation speed just before the rotation is stopped becomes small to reduce vibrations of the engine (vehicle body). Therefore, a feeling of discomfort experienced by the driver can be reduced. On the other hand, when the air amount in the cylinders is large, the fluctuation in engine rotation speed becomes large to give a feeling of discomfort due to the vibrations to the driver.

In the case where the starter is a push-out type starter in which a pinion gear is pushed out to be meshed with a ring gear, when a difference between a rotation speed of the ring gear and that of the pinion gear is small at the time of meshing between the ring gear and the pinion gear, the meshing can be achieved within a short period of time. Therefore, an unpleasant noise generated at the time of meshing is unlikely to be noticed by the driver. On the other hand, when the difference in rotation speed is large, a long time is required to achieve the meshing. As a result, the unpleasant noise generated at the time of meshing is likely to be noticed by the driver. Moreover, when the range of variation in the engine rotation speed is large, the difference in rotation speed greatly changes to hardly achieve the meshing. As a result, the unpleasant noise generated at the time of meshing is likely to be noticed by the driver.

On the other hand, during the fuel-cut, a throttle-valve opening degree is controlled so that the throttle valve is in a fully-closed position. There is a response delay from the generation of the restart request until the throttle-valve opening degree is increased from that in the fully-closed position to a target opening degree at the time of restart to increase the air amount in the cylinders to a requested air amount for the restart. The response delay of an intake system is significantly larger than that of a fuel injection system. Therefore, even if the fuel injection is restarted immediately in response to the generation of the restart request, the increase in air amount in the cylinders is delayed due to the response delay of the intake system, resulting in a small combustion torque of the engine at the time of restart.

Therefore, in the range of rotation speed in which the engine can be self-recovered, a frequency (probability) of failing in restart becomes higher. Further, even in the restart of the engine with the starter, the time from the restart to the recovery of the engine rotation speed becomes long. In order to prevent the aforementioned disadvantages, it is necessary to ensure a given air amount in the cylinders, that is, to set an intake-pipe pressure to a given value or larger before the generation of the restart request.

Specifically, in order to achieve the conflicting objects, that is, to ensure restartability while the fluctuation in engine rotation speed is reduced, it is necessary to control the air amount in the cylinders to fall within a given range, that is, to control the intake-pipe pressure to fall within a given range in preparation for the restart request, which may be generated at any time by a request of the driver after the generation of the automatic stop request.

Therefore, the following automatic stop/start control device for the internal combustion engine has been proposed. The automatic stop/start control device sets the control amount of the intake system, for example, the throttle-valve opening degree to the opening side (on the side on which the air amount increases) of the throttle-valve opening degree at the time of generation of the automatic stop request. The set throttle-valve opening degree enables a reduction of the fluctuation in engine rotation speed immediately before the stop of the engine rotation to reduce the vibrations of the engine while a necessary intake air amount is ensured to ensure restartability (for example, see Japanese Patent Application Laid-open No. 2010-242621). In the control device described above, the driving of the throttle-valve opening degree to the closing side along with a reduction in engine rotation speed has also been proposed. In this manner, the vibrations of the engine due to the fluctuation in engine rotation speed are further reduced.

However, the related art has the following problems.

In a process of the reduction of the engine rotation speed in response to the generation of the automatic stop request, an intake-pipe pressure is a pressure which achieves a balance between the air amount sucked into the cylinders through the throttle valve and the air amount exhausted from the cylinders to an exhaust pipe. In the aforementioned process, the intake-pipe pressure gradually increases as the engine rotation speed decreases. Finally, the intake-pipe pressure becomes equal to an atmospheric pressure.

The air amount passing through the throttle valve is determined by the throttle-valve opening degree and a difference between a pressure at upstream of the throttle valve and a pressure at downstream thereof. Therefore, as the throttle-valve opening degree becomes smaller, the air amount to be introduced into the intake pipe is reduced. Therefore, the degree of increase in intake-pipe pressure due to the reduction in engine rotation speed becomes smaller. Moreover, the throttle-valve opening degree at the time of generation of the automatic stop request is generally set to the opening degree that ensures the air amount which allows an idle state of the engine to be maintained (air amount for Idle Speed Control (ISC)).

In the automatic stop/start control device described in Japanese Patent Application Laid-open No. 2010-242621 cited above, both in the case where the throttle-valve opening degree is set constant and in the case where the throttle-valve opening degree is driven to the closing side with the reduction in engine rotation speed, the throttle-valve opening degree is not set on the closing side of the throttle-valve opening degree at the time of generation of the automatic stop request. Therefore, the air amount passing through the throttle valve is ensured to be equal to or larger than the air amount for ISC. As a result, the degree of increase in intake-pipe pressure due to the reduction in engine rotation speed becomes relatively large.

Accordingly, although the intake-pipe pressure is desired to be controlled to fall within a given range in order to achieve the conflicting objects described above, the time which allows the given range to be ensured becomes relatively short. As a result, the restart request is generated when the intake-pipe pressure is lower than the range in which the intake-pipe pressure is desired to fall under the control, or the intake-pipe pressure just before the stop of the rotation of the engine becomes higher than the range in which the intake-pipe pressure is desired to fall under the control. As a result, there is a problem in that the fluctuation in engine rotation speed becomes large.

Further, in the automatic stop/start control device described in Japanese Patent Application Laid-open No. 2010-242621 cited above, in the case where the throttle-valve opening degree is set constant, the throttle-valve opening degree cannot be set greatly larger than the throttle-valve opening degree at the time of generation of the automatic stop request because the throttle-valve opening degree is required to be set so as to achieve the conflicting objects described above. Therefore, there is another problem in that along time is required for the intake-pipe pressure to reach the range in which the intake-pipe pressure is desired to fall under the control. Moreover, if the throttle-valve opening degree is first set large and then is driven to the closing side with the reduction in engine rotation speed, a change in engine rotation speed which is set as a condition for driving the throttle-valve opening degree to the closing side does not actually occur.

SUMMARY OF THE INVENTION

The present invention has been made to solve the problems described above, and has an object to provide a control device for an internal combustion engine and a method of controlling the internal combustion engine, which are capable of quickly controlling an intake-pipe pressure within a range which allows restartability to be ensured while reducing a fluctuation in engine rotation speed after generation of an automatic stop request and allowing the intake-pipe pressure to be maintained for a longer period of time.

A control device for an internal combustion engine according to the present invention includes: an idle-stop control section for stopping fuel injection in response to generation of an automatic stop request to stop the internal combustion engine and restarting the internal combustion engine in response to generation of a restart request; and an intake-air amount control section for setting a control amount of an intake system for controlling an intake air amount of the internal combustion engine so that the intake air amount becomes approximately zero when an intake-pipe pressure of the internal combustion engine at time of the generation of the automatic stop request is higher than a predetermined pressure and setting the control amount of the intake system so that the intake air amount becomes larger than the intake air amount at the time of the generation of the automatic stop request until the intake-pipe pressure becomes equal to the predetermined pressure and then the intake air amount becomes approximately zero when the intake-pipe pressure is lower than the predetermined pressure.

Further, a method of controlling an internal combustion engine according to the present invention, the internal combustion engine including an idle-stop control section for stopping fuel injection in response to generation of an automatic stop request to stop the internal combustion engine and restarting the internal combustion engine in response to generation of a restart request, includes an intake-air amount control step of setting a control amount of an intake system for controlling an intake air amount of the internal combustion engine so that the intake air amount becomes approximately zero when an intake-pipe pressure of the internal combustion engine at time of the generation of the automatic stop request is higher than a predetermined pressure and setting the control amount of the intake system so that the intake air amount becomes larger than the intake air amount at the time of the generation of the automatic stop request until the intake-pipe pressure becomes equal to the predetermined pressure and then the intake air amount becomes approximately zero when the intake-pipe pressure is lower than the predetermined pressure.

According to the control device for the internal combustion engine and the method of controlling the internal combustion engine of the present invention, the intake-air amount control section sets (in the intake-air amount control step, set is) the control amount of the intake system for controlling the intake air amount of the internal combustion engine so that the intake air amount becomes approximately zero when the intake-pipe pressure of the internal combustion engine at the time of the generation of the automatic stop request is higher than the predetermined pressure and sets (set is) the control amount of the intake system so that the intake air amount becomes larger than the intake air amount at the time of the generation of the automatic stop request until the intake-pipe pressure becomes equal to the predetermined pressure and then the intake air amount becomes approximately zero when the intake-pipe pressure is lower than the predetermined pressure.

Therefore, the control device for the internal combustion engine and the method of controlling the internal combustion engine, which are capable of quickly controlling the intake-pipe pressure within the range which allows the restartability to be ensured while reducing the fluctuation in engine rotation speed after the generation of the automatic stop request and allowing the intake-pipe pressure to be maintained for the longer period of time, can be obtained.

DETAILED DESCRIPTION OF THE PREFERRED EMBODIMENT

Hereinafter, a preferred embodiment of a control device for an internal combustion engine according to the present invention is described referring to the drawings. In each of the drawings, the same or equivalent parts are denoted by the same reference symbols for description.

Embodiment 1

Figure 1:
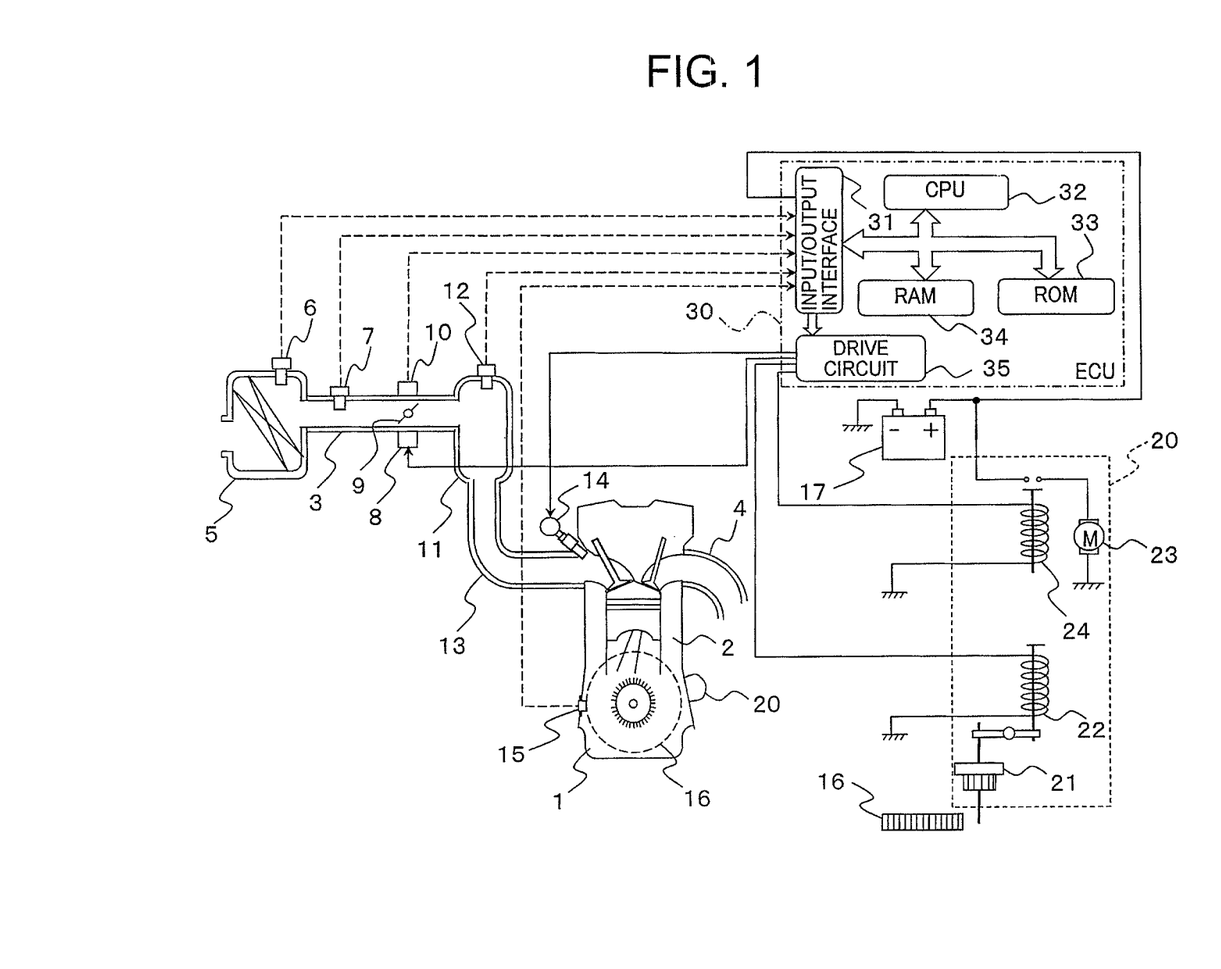
FIG. 1 is a configuration diagram illustrating an overall system including a control device for an internal combustion engine, according to Embodiment 1 of the present invention.

FIG. 1 is a configuration diagram illustrating an overall system including a control device for an internal combustion engine, according to Embodiment 1 of the present invention. Although a plurality of cylinders 2 are provided to an internal combustion engine 1 (hereinafter, referred to simply as "engine 1"), only one of the cylinders 2 is illustrated in FIG. 1.

In FIG. 1, an intake pipe 3 and an exhaust pipe 4 are connected to the cylinder 2 of the engine 1. The intake pipe 3 is used to suck air into the cylinder 2. The exhaust pipe 4 is used to exhaust an exhaust gas generated by the combustion of a mixture in a combustion chamber (not shown) of the cylinder 2. On the upstream side of the intake pipe 3, an air filter 5 is provided. An intake-air temperature sensor 6 for detecting a temperature of intake air is mounted to the air filter 5. On the downstream of the air filter 5, an airflow sensor 7 for detecting a flow rate of the intake air (intake air amount) is mounted.

On the downstream side of the airflow sensor 7, a throttle valve 9 is provided. The throttle valve 9 adjusts the flow rate of the intake air by using power of a motor 8. A throttle-valve opening degree sensor 10 for detecting an opening degree of the throttle valve 9 is provided to the intake pipe 3 in the vicinity of the throttle valve 9. On the downstream side of the throttle valve 9, a surge tank 11 is provided.

An intake pressure sensor 12 for detecting an intake-pipe pressure is mounted to the surge tank 11. On the downstream of the surge tank 11, an intake manifold 13 for supplying the intake air to the combustion chamber of each of the cylinders 2 in a distributed manner is provided. A fuel injection valve 14 for injecting a fuel is provided to the intake manifold 13 in the vicinity of an intake port of each of the cylinders 2.

The mixture of the fuel injected from the fuel injection valve 14 and the intake air is sucked into the combustion chamber of each of the cylinders 2 through an intake valve (not shown). The mixture sucked into the combustion chamber of each of the cylinders 2 is ignited by a spark plug (not shown) which is provided to the top of the cylinder 2 so as to ignite the sucked mixture to combust. An exhaust gas generated by the combustion of the mixture passes through a catalyst (not shown) from the exhaust pipe to be exhausted to an atmosphere.

A water-temperature sensor (not shown) for detecting a temperature of cooling water for the engine 1 and a crank-angle sensor 15 for detecting a signal which is output each time a crankshaft of the engine 1 rotates by a predetermined angle are mounted to the engine 1. An engine control unit (hereinafter, abbreviated as "ECU") 30 described below detects a crank angle and computes an engine rotation speed based on the detection signal of the crank-angle sensor 15.

A starter 20 is also provided to the engine 1. The starter 20 rotationally drives a ring gear 16 provided to the engine 1 at the time of start (key-ON start) with a key (not shown) or restart. The starter 20 includes a pinion gear 21, a pinion push-out section 22, a starter motor 23, and a starter-motor driving section 24.

The pinion gear 21 is meshed with the ring gear 16 to rotationally drive the ring gear 16. The pinion push-out section 22 pushes the pinion gear 21 toward the ring gear 16 so that the pinion gear 21 comes into meshing engagement with the ring gear 16. The starter-motor driving section 24 drives the starter motor 23 to rotationally drive the pinion gear 21.

Each of the pinion push-out section 22 and the starter-motor driving section 24 is individually driven by a drive signal from the ECU 30. The operation of the starter 20 is described below in detail. The starter 20, the ECU 30, and the various sensors described above are supplied with electric power from a battery 17.

The ECU 30 includes an input/output interface 31, a CPU (microprocessor) 32, a read-only memory (ROM) 33, a random-access memory (RAM) 34, and a drive circuit 35. Output signals from the various sensors described above and detection signals for the amount of depression of an accelerator pedal (not shown) and the amount of depression of a brake pedal (not shown) are input to the input/output interface 31.

The CPU 32 performs a computation for whether or not control for start, stop and restart of the engine 1 can be performed and outputs the results of computation to the drive circuit 35. The ROM 33 stores a control program and various control constants used for various computations performed in the CPU 32. The RAM 34 temporarily stores the results of computation performed in the CPU 32. The drive circuit 35 outputs the drive signal to the fuel injection valve 14 and the like according to the results of computation performed in the CPU 32.

The ECU 30 executes a computation of the engine rotation speed based on the detection signal of the crank-angle sensor 15. The ECU 30 also determines an operating state of the engine 1 by using the control program and control constants stored in the ROM 33 based on the output signals from the various sensors including the intake-air temperature sensor 6 so as to output a drive signal and a control amount according to the intention of a driver to the fuel injection valve 14, the motor 8 and the like. The ECU 30 also determines whether or not an automatic stop requirement or a restart requirement of the engine 1 is satisfied so as to perform control on the throttle valve 9 during the automatic stop of the engine 1 and control on the starter 20 at the time of restart.

Subsequently, the operation of the starter 20 is described. First, when a rotating state of the engine 1 satisfies the restart requirement after the stop at the time of key-ON start or after the automatic stop of the engine 1, the CPU 32 executes a computation for the start or a computation for the restart of the engine 1 based on the output signals from the various sensors, which are input to the ECU 30 through the input/output interface 31.

Next, the drive signal is output from the drive circuit 35 of the ECU 30 to the pinion push-out section 22 based on the results of computation to start energizing the pinion push-out section 22. By the start of the energization of the pinion push-out section 22, the pinion gear 21 is pushed out to be meshed with the ring gear 16.

Thereafter, the drive signal is output from the drive circuit 35 of the ECU 30 to the starter-motor driving section 24 to close a feed circuit for the starter motor 23. Then, the power is supplied from the battery 17 to drive the starter motor 23 to start rotationally driving the engine 1 through an intermediation of the pinion gear 21 and the ring gear 16. As a result, the engine 1 is started or restarted.

After the restart requirement is satisfied while the engine 1 is rotating by inertia after the automatic stop, an engine rotation speed Ne is computed by rotation speed computation means configured by program software in the CPU 32 based on the detection signal from the crank-angle sensor 15, which is input to the ECU 30, as described below. Thereafter, the drive signal according to the computed engine rotation speed Ne is output to the pinion push-out section 22 or the starter-motor driving section 24 from the drive circuit 35 of the ECU 30 to drive the starter 20 to restart the engine 1.

The ECU 30 includes an idle-stop control section and an intake-air amount control section.

The idle-stop control section stops the fuel injection in response to the generation of an automatic stop request to stop the engine 1 and restarts the engine 1 in response to the generation of a restart request.

When the intake-pipe pressure of the engine 1 at the time of generation of the automatic stop request is higher than a predetermined pressure, the intake-air amount control section sets a control amount of an intake system for controlling the intake air amount of the engine 1 so that an intake air amount becomes approximately zero. On the other hand, when the intake-pipe pressure is lower than the predetermined pressure, the intake-air amount control section sets the control amount of the intake system so that the intake air amount becomes larger than that at the time of generation of the automatic stop request until the intake-pipe pressure becomes equal to the predetermined pressure and then the intake-air amount become approximately zero.

The predetermined pressure is an intake-pipe pressure which allows a fluctuation in rotation speed of the engine 1 to be equal to or smaller than a predetermined amount at the time of restart of the engine 1 and allows the air amount in the cylinders of the engine 1 at the time of generation of the restart request to be equal to or larger than the air amount which is necessary to combust the fuel supplied to the cylinders.

Figure 2:
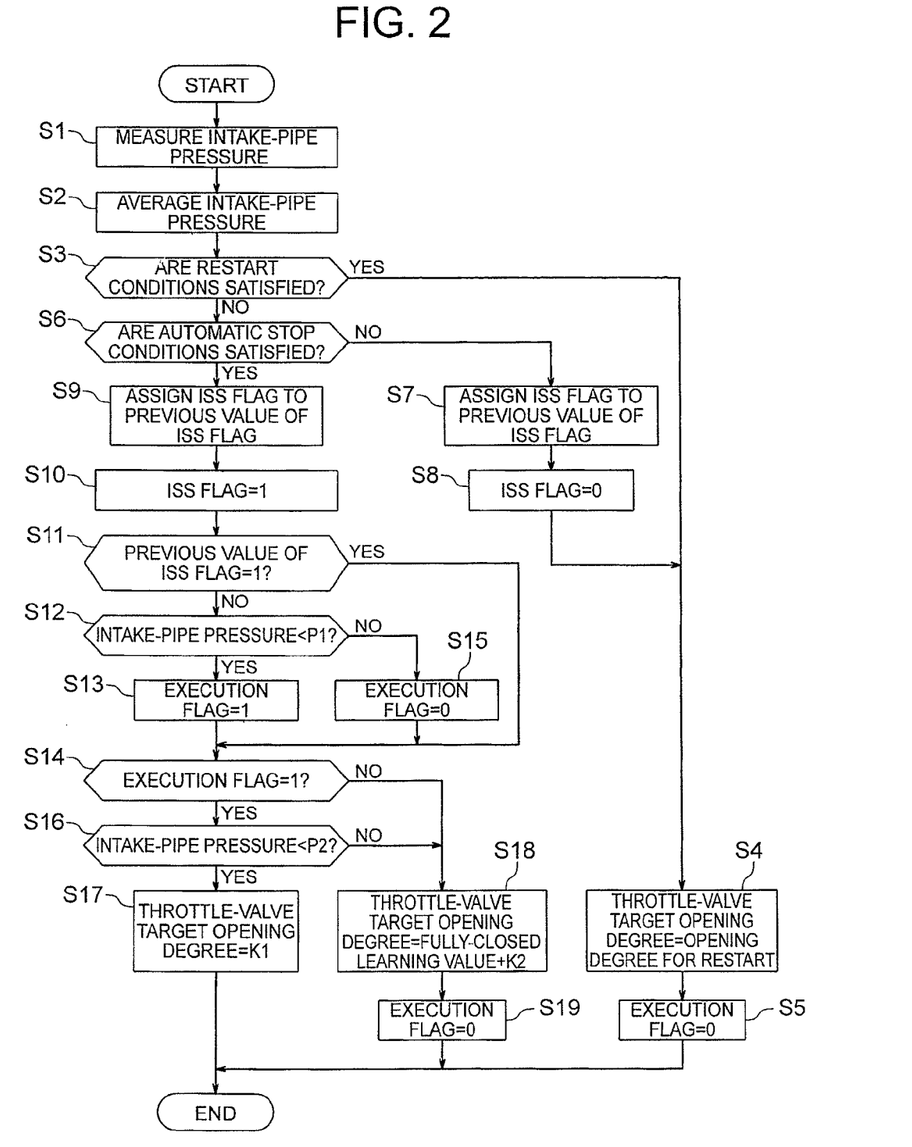
FIG. 2 is a flowchart illustrating an operation of the control device for the internal combustion engine, according to Embodiment 1 of the present invention.

Next, an operation of the control device for the internal combustion engine according to Embodiment 1 of the present invention is described referring to a flowchart of FIG. 2. The operation is executed every predetermined time period in the ECU 30.

In FIG. 2, first, the ECU 30 measures the intake-pipe pressure of the engine 1 (Step S1). Subsequently, the ECU 30 performs averaging processing of the intake-pipe pressure measured in Step S1 (Step S2). Next, the ECU 30 determines whether or not restart conditions are satisfied (Step S3).

When it is determined in Step S3 that the restart conditions are satisfied (that is, Yes), the ECU 30 sets a throttle-valve target opening degree to an opening degree for restart and restarts the engine 1 (Step S4). Subsequently, the ECU 30 clears an execution flag to zero (Step S5). Then, the processing illustrated in FIG. 2 is terminated.

On the other hand, when it is determined in Step S3 that the restart conditions are not satisfied (that is, No), the ECU 30 determines that each of the restart conditions is not satisfied, for example, the brake pedal is depressed, and therefore the restart requirement is not satisfied. Therefore, the ECU 30 then determines whether or not automatic stop conditions are satisfied (Step S6).

When it is determined in Step S6 that the automatic stop conditions are not satisfied (that is, No), the ECU 30 determines that each of the automatic stop conditions is not satisfied, for example, the brake pedal is not depressed, and therefore the automatic stop requirement is not satisfied. Then, the ECU 30 assigns an Idle Stop System (ISS) flag to a previous value of the ISS flag (Step S7). Next, the ECU 30 clears the ISS flag to zero (Step S8). Then, the processing proceeds to Step S4.

On the other hand, when it is determined in Step S6 that the automatic stop conditions are satisfied (that is, Yes), the ECU 30 assigns the ISS flag to the previous value of the ISS flag (Step S9). Subsequently, the ECU 30 sets the ISS flag to 1 (Step S10). Next, the ECU 30 determines whether or not the previous value of the ISS flag is 1 (Step S11).

When it is determined in Step S11 that the previous value of the ISS flag is not 1 (is zero) (that is, No), the ECU 30 determines whether or not the intake-pipe pressure is smaller than a first criterion value P1 (Step S12).

When it is determined in Step S12 that the intake-pipe pressure is smaller than the first criterion value P1 (that is, Yes), the ECU 30 sets the execution flag to 1 (Step S13) and then determines whether or not the execution flag is set to 1 (Step S14).

On the other hand, when it is determined in Step S12 that the intake-pipe pressure is equal to or larger than the first criterion value P1 (that is, No), the ECU 30 clears the execution flag to zero (Step S15). Then, the processing proceeds to Step S14. When it is determined in Step S11 that the previous value of the ISS flag is 1 (that is, Yes), the processing directly proceeds to Step S14.

When it is determined in Step S14 that the execution flag is set to 1 (that is, Yes), the ECU 30 then determines whether or not the intake-pipe pressure is smaller than a second criterion value P2 (Step S16).

When it is determined in Step S16 that the intake-pipe pressure is smaller than the second criterion value P2 (that is, Yes), the ECU 30 sets the throttle-valve target opening degree to a predetermined value K1 (Step S17). Then, the processing illustrated in FIG. 2 is terminated.

On the other hand, when it is determined in Step S14 that the execution flag is cleared to zero (that is, No) or it is determined in Step S16 that the intake-pipe pressure is equal to or larger than the second criterion value P2 (that is, No), the ECU 30 sets a value obtained by adding a predetermined value K2 to a fully-closed learning value as the throttle-valve target opening degree (Step S18). Subsequently, the ECU 30 clears the execution flag to zero (Step S19). Then, the processing illustrated in FIG. 2 is terminated.

Figure 3:
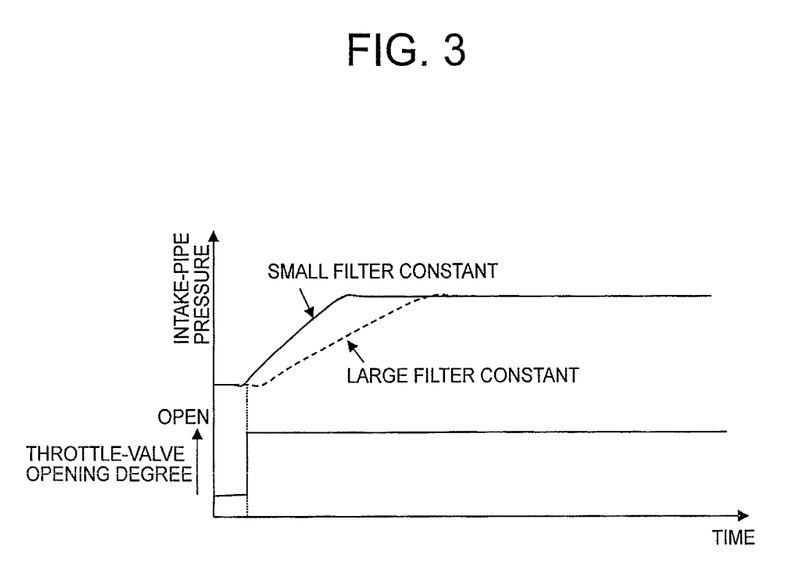
FIG. 3 is an explanatory view illustrating response characteristics of an intake-pipe pressure to a throttle-valve opening degree in the control device for the internal combustion engine, according to Embodiment 1 of the present invention.

The averaging processing of the intake-pipe pressure, which is performed in Step S2, is now described referring to FIG. 3. The intake-pipe pressure detected by the intake pressure sensor 12 pulsates interlockingly with the movement of a piston of the engine 1. Therefore, the intake-pipe pressure is averaged by using a filter so as to remove the pulsation therefrom. When a filter constant is too large, as illustrated in FIG. 3, there is a fear of generation of a detection delay when the intake-pipe pressure transiently changes. The averaging processing of the intake-pipe pressure may be executed by moving average.

Figure 4A:
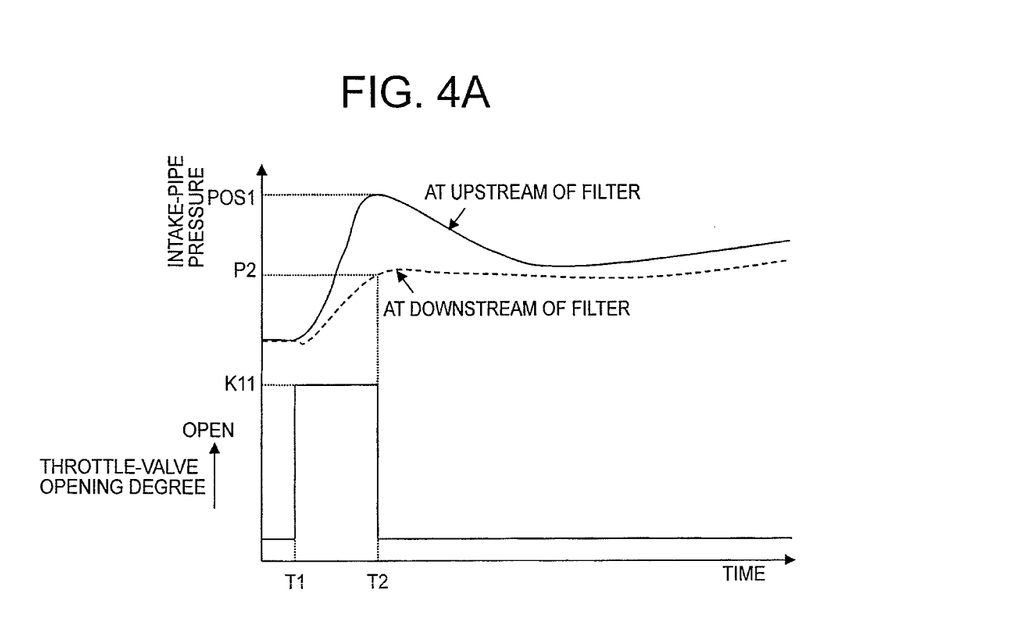
FIG. 4A is an explanatory view illustrating response characteristics of the intake-pipe pressure to a step amount of the throttle-valve opening degree in the control device for the internal combustion engine, according to Embodiment 1 of the present invention.
Figure 4B:
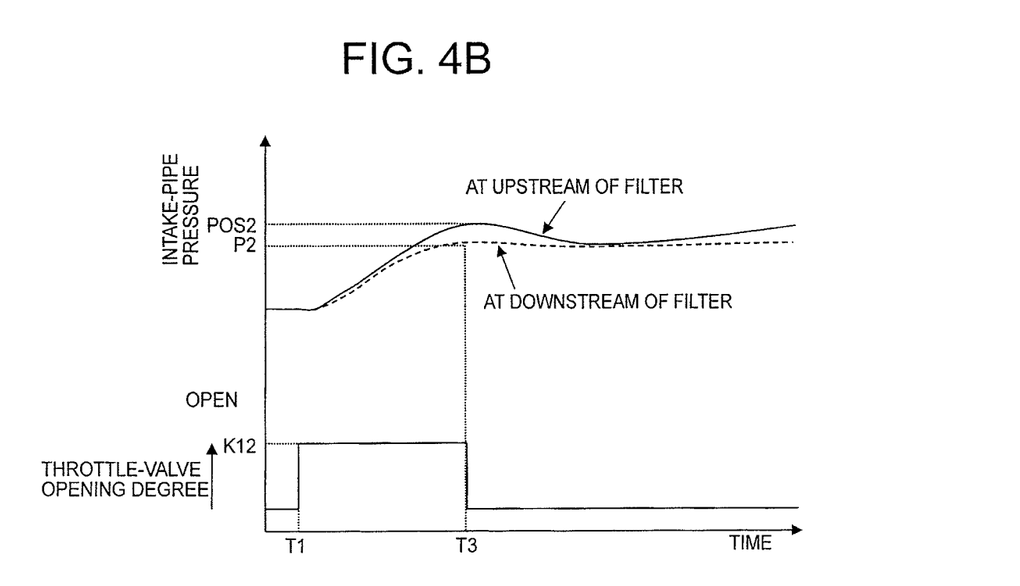
FIG. 4B is another explanatory view illustrating the response characteristics of the intake-pipe pressure to the step amount of the throttle-valve opening degree in the control device for the internal combustion engine, according to Embodiment 1 of the present invention.

Next, the set value K1 of the throttle-valve opening degree obtained when the ISS flag is set to 1 is described referring to FIGS. 4A and 4B. FIG. 4A illustrates an example of responses of the intake-pipe pressure to the set value of the throttle-valve opening degree obtained when the set value of the throttle-valve opening degree is large, whereas FIG. 4B illustrates an example of responses of the intake-pipe pressure to the set value of the throttle-valve opening degree obtained when the set value of the throttle-valve opening degree is small. For the intake-pipe pressure, the solid line indicates the intake-pipe pressure at the upstream of the filter and the broken line indicates the intake-pipe pressure at the downstream of the filter. In the program, control is performed by using the intake-pipe pressure at the downstream of the filter.

In FIG. 4A, the throttle-valve opening degree is increased to K11 at time T1. As a result, the intake-pipe pressure starts increasing. Thereafter, at time T2, the intake-pipe pressure at the downstream of the filter becomes equal to the second criterion value P2 described above. Therefore, the throttle valve 9 is closed. At this time, the intake-pipe pressure at the upstream of the filter is increased to POS1.

In FIG. 4B, the throttle-valve opening degree is increased to K12 (K12<K11) at time T1. As a result, the intake-pipe pressure starts increasing. Thereafter, the intake-pipe pressure at the downstream of the filter becomes equal to the second criterion value P2 described above at time T3. Therefore, the throttle valve 9 is closed. At this time, the intake-pipe pressure at the upstream of the filter is increased to POS2.

It is understood from FIGS. 4A and 4B that a time period required for the intake-pipe pressure to reach the second criterion value P2 becomes shorter as the set value of the throttle-valve opening degree is larger. Moreover, it is understood that the response of the intake-pipe pressure at the downstream of the filter is stabilized at the intake-pipe pressure in the vicinity of the second criterion value P2 both in the case of FIG. 4A and in the case of FIG. 4B.

However, the response of the intake-pipe pressure at the upstream of the filter overshoots to POS1 in the case of FIG. 4A and to POS2 in the case of FIG. 4B. The intake-pipe pressure which is optimal for the restart of the engine 1 is P2. Therefore, in the case of FIG. 4A, the range of variation in the engine rotation speed becomes large to result in a large change in difference between the rotation speed of the ring gear and that of the pinion gear. Therefore, the ring gear and the pinion gear are brought into a state in which the meshing therebetween is difficult to achieve. Thus, an unpleasant noise generated at the time of meshing is more likely to be noticeable to the driver. Therefore, the set value K1 of the throttle-valve opening degree is set so that an overshoot amount of the intake-pipe pressure becomes equal to or smaller than a predetermined value and the time period required for the intake-pipe pressure to reach the second criterion value P2 becomes equal to or shorter than a predetermined time period according to the amount of exhausted gas of the engine 1 and throttle-valve flow-rate characteristics.

Next, the predetermined value K2 to be added to the fully-closed learning value of the throttle-valve opening degree is described. The fully-closed learning value of the throttle-valve opening degree is a sensor value obtained when the throttle valve 9 is pressed against the intake pipe 3 during the engine stop immediately after key-OFF, which is stored as a learning value.

If a change occurs between an atmospheric temperature at the time of learning of the fully-closed learning value and an atmospheric temperature at the time of execution of the control when the throttle valve 9 is to be fully opened, there is a possibility that the throttle valve 9 is excessively pressed against the intake pipe 3 due to temperature characteristics of the motor 8 which drives the throttle valve 9. If the throttle valve 9 is excessively pressed against the intake pipe 3, there is a fear of motor burnout in the worst case. Therefore, by adding a margin corresponding to the predetermined value K2 to the fully-closed learning value, the motor burnout can be avoided to enable the execution of the throttle-valve control. As the set value of the predetermined value K2, about 5 mV is generally used.

Figure 5:
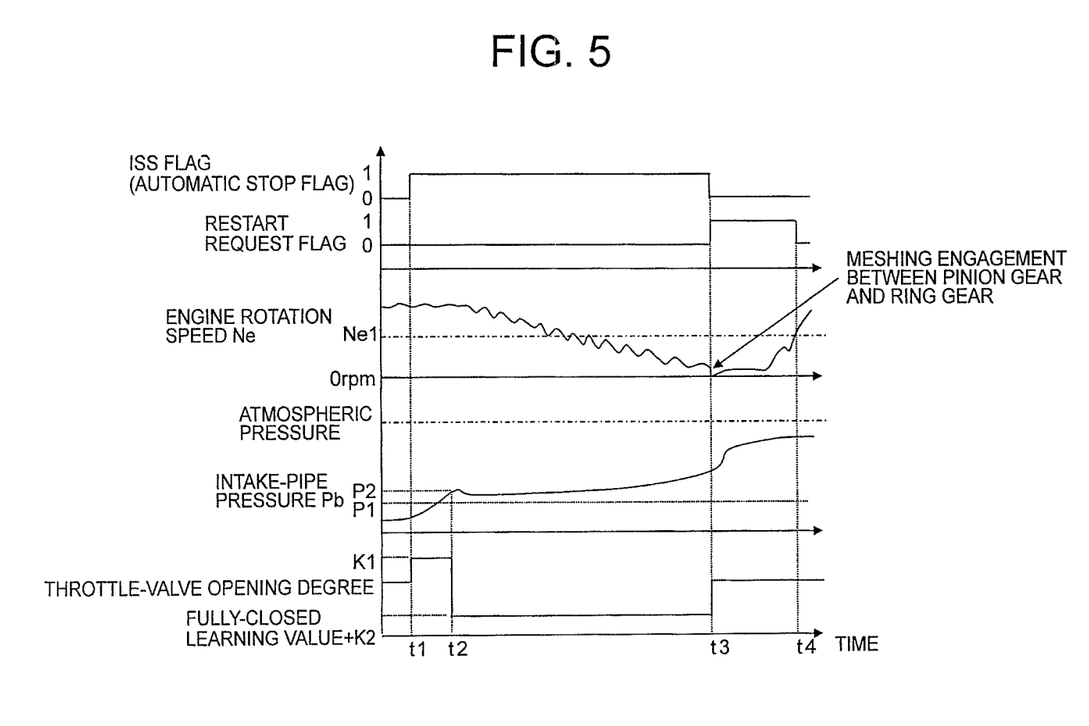
FIG. 5 is a timing chart illustrating an operation of the control device for the internal combustion engine, according to Embodiment 1 of the present invention.
Figure 6:
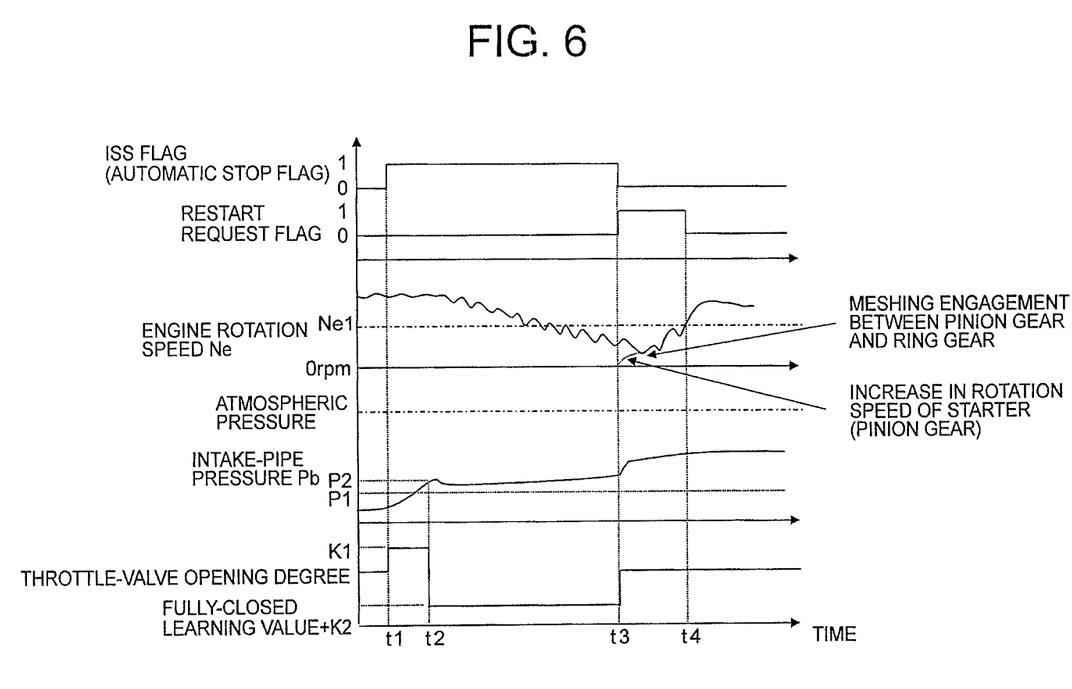
FIG. 6 is another timing chart illustrating the operation of the control device for the internal combustion engine, according to Embodiment 1 of the present invention.

Subsequently, an operation of the control device for the internal combustion engine according to Embodiment 1 of the present invention is described referring to timing charts of FIGS. 5 and 6. FIG. 5 illustrates responses obtained when the restart request is generated in the case where the engine rotation speed is low, whereas FIG. 6 illustrates responses obtained when the restart request is generated in the case where the engine rotation speed is high.

In FIG. 5, first, when the automatic stop requirement of the engine 1 is satisfied at time t1, the fuel supply from the fuel injection valve 14 is stopped or the like to execute the automatic stop control. Then, the ISS flag is set to 1. As a result of the satisfaction of the automatic stop requirement to execute the automatic stop control, the engine rotation speed Ne is reduced while the engine 1 is rotating by inertia after time t1.

At this time (time t1), an intake-pipe pressure Pb and the first criterion value P1 [mmHg] are compared with each other. In the case of FIG. 5, the intake-pipe pressure Pb is smaller than the first criterion value P1. Therefore, the throttle-valve opening degree is set to the predetermined value K1. By setting the throttle-valve opening degree to the predetermined value K1 at time t1, the intake-pipe pressure Pb increases subsequently.

Subsequently, at time t2 at which the intake-pipe pressure Pb exceeds the second criterion value P2, the throttle-valve opening degree is set to the value obtained by adding the predetermined value K2 to the fully-closed learning value. As a result, the intake-pipe pressure Pb can be maintained in the vicinity of the first criterion value P1 which allows the air amount necessary for the restart to be ensured.

Next, at time t3, each of the restart conditions such as the release of the brake pedal is satisfied, the restart request flag (execution flag) is set to 1. Then, the throttle-valve opening degree is set to the opening degree for the restart.

At this time (time t3), as a result of the satisfaction of the restart conditions to execute the restart, the pinion push-out section 22 is driven to mesh the pinion gear 21 with the ring gear 16. Thereafter, the starter motor 23 is driven by the starter-motor driving section 24. Then, the engine 1 is driven by the starter 20 through an intermediation of the pinion gear 21 and the ring gear 16 and accelerates.

Simultaneously with the start of acceleration of the engine 1, the fuel supply from the fuel injection valve 14 is restarted to restart the combustion in the engine 1. As a result, the engine rotation speed Ne exceeds Ne1 [rpm] to complete the restart of the engine 1. After time t4, the throttle-valve opening degree is set according to an accelerator opening degree.

Next, in FIG. 6, the responses obtained until time t3 are the same as those illustrated in FIG. 5. Therefore, the description thereof is herein omitted.

In FIG. 6, when each of the restart conditions such as the release of the brake pedal is satisfied at time t3, the restart request flag is set to 1. Then, the throttle-valve opening degree is set to the opening degree at the time of restart.

Figure 7:
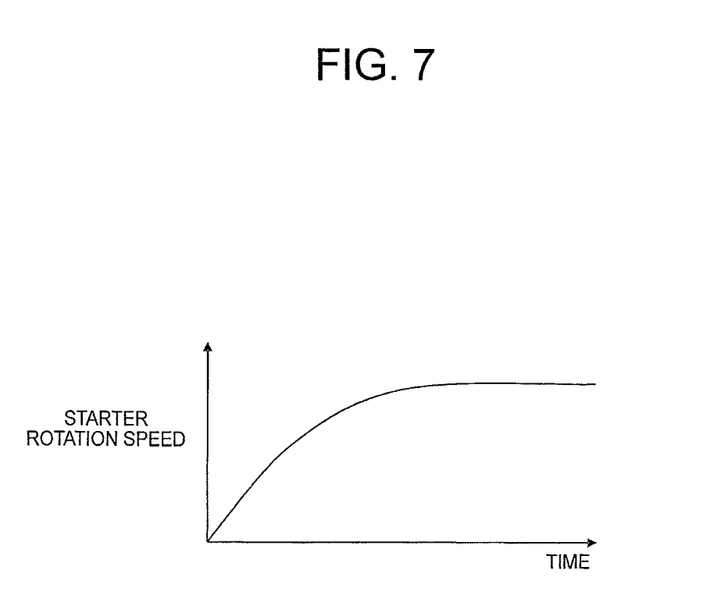
FIG. 7 is an explanatory view illustrating rotation speed characteristics of a starter motor in the control device for the internal combustion engine, according to Embodiment 1 of the present invention.

When the restart requirement is satisfied at time t3, the acceleration by the starter 20 is required to restart the engine 1. For the high engine rotation speed Ne, however, the starter motor 23 is first driven by the starter-motor driving section 24. As a result, the pinion gear 21 starts rotating as indicated by the broken line. The rotation speed of the pinion gear 21 increases as a characteristic illustrated in FIG. 7. On the other hand, the engine rotation speed Ne is reduced while the engine is rotating by inertia. Therefore, the rotation speed of the pinion gear 21 and the engine rotation speed Ne become equal to each other a predetermined time after the start of the rotation of the pinion gear 21.

The pinion push-out section 22 is driven in synchronization with a timing at which the engine rotation speed Ne and the rotation speed of the pinion gear 21 become equal to each other. After the pinion gear 21 is brought into meshing engagement with the ring gear 16, the engine 1 is driven by the starter motor 23 of the starter 20 and accelerates.

Simultaneously with the start of the acceleration of the engine 1, the fuel supply from the fuel injection valve 14 is restarted to restart the combustion in the engine 1. As a result, the engine rotation speed Ne exceeds Ne1 [rpm] to complete the restart of the engine 1. After time t4, the throttle-valve opening degree is set according to the accelerator opening degree.

In FIGS. 5 and 6, it is recommended that the first criterion value P1 be set to about 300 [mmHg] and the second criterion value be set to about 310 [mmHg], which allow the air amount necessary for the restart of the engine 1 to be ensured. Although the first criterion value P1 and the second criterion value P2 are set so as to satisfy the relation of P1<P2 in FIG. 5, P1 and P2 may set to the same value.

As described above, according to Embodiment 1, the intake-air amount control section sets the control amount of the intake system for controlling the intake air amount of the internal combustion engine so that the intake air amount becomes approximately zero when the intake-pipe pressure of the internal combustion engine at the time of generation of the automatic stop request is higher than the predetermined pressure and sets the control amount of the intake system so that the intake air amount becomes larger than that at the time of generation of the automatic stop request until the intake-pipe pressure becomes equal to the predetermined pressure and then the intake air amount becomes approximately zero when the intake-pipe pressure is lower than the predetermined pressure.

Therefore, the control device for the internal combustion engine and a method of controlling the internal combustion engine, which can quickly control the intake-pipe pressure to fall within the range in which the restartability can be ensured while a fluctuation in engine rotation speed is reduced after the generation of the automatic stop request and allow the intake-pipe pressure to be maintained for a longer period of time, can be obtained.

The predetermined pressure is the intake-pipe pressure at which the fluctuation in rotation speed of the internal combustion engine becomes equal to or smaller than a predetermined amount at the time of restart of the internal combustion engine and the air amount in the cylinders of the internal combustion engine at the time of generation of the restart becomes equal to or larger than the air amount necessary to combust the fuel supplied to the cylinders.

Accordingly, the vibrations of the engine and the unpleasant noise generated until the completion of the meshing engagement between the pinion gear and the ring gear can be reduced.

The intake-pipe pressure is a value obtained by performing the moving average processing or the filtering processing on the measured intake-pipe pressure. Therefore, the pulsation of the intake air can be reduced to control the intake-pipe pressure within the range which can preferably ensure the restart.

The set value set so that the intake air amount becomes larger is a value at which the overshoot amount of the intake-pipe pressure becomes equal to or smaller than the predetermined value and the time period required for the intake-pipe pressure to reach the predetermined pressure becomes equal to or shorter than the predetermined time period. Therefore, the range in which the pinion gear and the ring gear can be brought into meshing engagement can be increased.

Although the example where the intake-pipe pressure is controlled by using the throttle-valve opening degree has been described above in Embodiment 1, the present invention is not limited thereto. The control amount of the intake system may be at least one of an opening degree of an EGR valve and a lift amount of a variable intake valve. Even in such a case, the same effects as those of Embodiment 1 described above can be obtained.

What is claimed is:

1. A control device for an internal combustion engine, comprising:
  an idle-stop control section for stopping fuel injection in response to generation of an automatic stop request to stop the internal combustion engine and restarting the internal combustion engine in response to generation of a restart request;
  an intake-air amount control section for setting a control amount of an intake system for controlling an intake air amount of the internal combustion engine so that the intake air amount becomes approximately zero when an intake-pipe pressure of the internal combustion engine at time of the generation of the automatic stop request is higher than a predetermined pressure and setting the control amount of the intake system so that the intake air amount becomes larger than the intake air amount at the time of the generation of the automatic stop request until the intake-pipe pressure becomes equal to the predetermined pressure and then the intake air amount becomes approximately zero when the intake-pipe pressure is lower than the predetermined pressure and;
  wherein the intake-pipe pressure comprises a value obtained by performing one of moving average processing and filtering processing on a measured intake-pipe pressure.

2. A control device for an internal combustion engine according to claim 1, wherein the predetermined pressure comprises an intake-pipe pressure at which a fluctuation in rotation speed of the internal combustion engine becomes equal to or smaller than a predetermined amount at time of the restarting the internal combustion engine and an air amount in a cylinder of the internal combustion engine at time of the generation of the restart request becomes equal to or larger than an air amount necessary for combusting a fuel supplied to the cylinder.

3. A control device for an internal combustion engine according to claim 1, wherein when the control amount is set so that the intake air amount becomes larger than the intake air amount at the time of generation of the automatic stop request a value at which an overshoot amount of the intake-pipe pressure becomes equal to or smaller than a predetermined value and a time period required for the intake-pipe pressure to reach the predetermined pressure is equal to or shorter than a predetermined time period.

4. A control device for an internal combustion engine according to claim 1, the control amount of the intake system comprises at least one of an opening degree of a throttle valve of the internal combustion engine, an opening degree of an EGR valve, and a lift amount of a variable intake valve.

5. A control device for an internal combustion engine according to claim 1, wherein the idle-stop control section pushes out a pinion gear of a starter provided to the internal combustion engine to mesh the pinion gear with a ring gear of the internal combustion engine to restart the internal combustion engine when the restart request is generated.

6. A method of controlling an internal combustion engine, the internal combustion engine comprising an idle-stop control section for stopping fuel injection in response to generation of an automatic stop request to stop the internal combustion engine and restarting the internal combustion engine in response to generation of a restart request, the method comprising an intake-air amount control step of setting a control amount of an intake system for controlling an intake air amount of the internal combustion engine so that the intake air amount becomes approximately zero when an intake-pipe pressure of the internal combustion engine at time of the generation of the automatic stop request is higher than a predetermined pressure and setting the control amount of the intake system so that the intake air amount becomes larger than the intake air amount at the time of the generation of the automatic stop request until the intake-pipe pressure becomes equal to the predetermined pressure and then the intake air amount becomes approximately zero when the intake-pipe pressure is lower than the predetermined pressure and;

wherein the intake-pipe pressure comprises a value obtained by performing one of moving average processing and filtering processing on a measured intake-pipe pressure.

* * * * *